(12) United States Patent
Moss et al.

(10) Patent No.: US 6,494,070 B1
(45) Date of Patent: Dec. 17, 2002

(54) ELECTRONIC SYSTEM HOUSING KEYLOCK COVER

(75) Inventors: David L. Moss, Austin, TX (US); Timothy C. Dearborn, Austin, TX (US); Mark E. Ganniger, Round Rock, TX (US); Clay B. Sakewitz, Taylor, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/309,031

(22) Filed: May 10, 1999

(51) Int. Cl.[7] ................................................ E05B 17/14
(52) U.S. Cl. ........................ 70/423; 70/455; 70/456 R; 292/DIG. 4
(58) Field of Search .................... 70/158–162, DIG. 43, 70/DIG. 63, DIG. 56, DIG. 81, 423–429, 455, 456 R; 292/DIG. 7

(56) References Cited

U.S. PATENT DOCUMENTS

| | | | | |
|---|---|---|---|---|
| 1,550,093 A | * | 8/1925 | Moseley | |
| 2,062,417 A | * | 12/1936 | Jay | |
| 3,744,864 A | * | 7/1973 | Schmitz | |
| 4,068,506 A | | 1/1978 | Phelps | 70/100 |
| 4,073,165 A | * | 2/1978 | Grundstrom et al. | 70/389 |
| 4,123,978 A | | 11/1978 | Lentini | 109/51 |
| 4,192,161 A | | 3/1980 | Borlinghaus | 70/455 |
| 4,304,447 A | | 12/1981 | Ellwood et al. | 312/204 |
| 4,350,032 A | * | 9/1982 | Kochackis | 70/DIG. 63 |
| 4,463,484 A | | 8/1984 | Valle Arizpe | 27/2 |
| 4,586,355 A | | 5/1986 | Lee et al. | 70/455 |
| 4,597,274 A | | 7/1986 | Coscia et al. | 70/455 |
| 4,656,848 A | | 4/1987 | Rose | 70/58 |
| 4,674,308 A | | 6/1987 | Peters | 858/650 |
| 4,709,567 A | | 12/1987 | Applebaum | 70/54 |
| 4,723,428 A | | 2/1988 | Yamaguchi | 70/455 |
| 4,729,614 A | | 3/1988 | Nadler et al. | 312/292 |
| 4,773,242 A | | 9/1988 | Smith | 70/455 |
| 4,790,582 A | | 12/1988 | Keast | 292/288 |
| 4,792,165 A | * | 12/1988 | Nishimura | 292/DIG. 4 |
| 4,821,652 A | | 4/1989 | Hoffman | 109/23 |
| 4,881,391 A | * | 11/1989 | Villa et al. | 70/423 |
| 4,967,576 A | * | 11/1990 | Warfman | 70/63 |
| 5,050,922 A | | 9/1991 | Falcoff | 296/37.7 |
| 5,058,764 A | | 10/1991 | Gaba | 220/481 |
| 5,116,261 A | | 5/1992 | Lan et al. | 312/292 |
| 5,199,888 A | | 4/1993 | Condra et al. | 439/142 |
| 5,211,430 A | | 5/1993 | Chern | 282/80 |
| 5,245,511 A | | 9/1993 | Watanabe | 361/814 |
| 5,495,389 A | * | 2/1996 | Dewitt et al. | 70/58 |
| 5,539,169 A | | 7/1996 | Sekita | 200/524 |
| 5,577,820 A | * | 11/1996 | Kim et al. | 292/DIG. 4 |
| 5,586,934 A | | 12/1996 | Dombrowski et al. | 454/309 |
| 5,615,567 A | | 4/1997 | Kemp | 70/455 |

(List continued on next page.)

OTHER PUBLICATIONS

*IBM Personal System/2® Model P70 386: Quick Reference*; Mar. 1989; pp. iii–73.

Primary Examiner—Lloyd A. Gall
(74) Attorney, Agent, or Firm—Baker Botts L.L.P.

(57) ABSTRACT

A keylock cover for an electronic system housing such as a computer system housing. The keylock cover is movably coupled to the housing to move between an open position where the keylock is exposed, to a closed position where the keylock is hidden from view. The keylock cover may be secured in a closed position with a push-push latch mounted in the housing. The keylock cover may include a key retainer that retains a key that is compatible with the keylock to the keylock cover. Computer system identification information such as vender names or product names can be located on the outer side of the keylock cover. In one example, the keylock cover is movably coupled to a bezel of the electronic system housing.

45 Claims, 7 Drawing Sheets

U.S. PATENT DOCUMENTS

| | | | |
|---|---|---|---|
| 5,638,710 A | 6/1997 | Howard, Jr. et al. | 70/259 |
| 5,642,634 A | 7/1997 | Perry | 70/18 |
| 5,713,650 A | 2/1998 | King et al. | 312/265.4 |
| 5,718,137 A | 2/1998 | Huston | 70/423 |
| 5,720,379 A | 2/1998 | Schwartz et al. | 200/318.1 |
| 5,758,529 A * | 6/1998 | Chhatwal | 70/423 |
| 5,787,737 A * | 8/1998 | Cho | 70/58 |
| 5,815,379 A | 9/1998 | Mundt | 361/683 |
| 5,826,922 A * | 10/1998 | Wernig | 292/39 |
| 5,836,638 A | 11/1998 | Slocum | 296/97.22 |
| 5,860,165 A | 1/1999 | Cvijanovich | 2/195.1 |
| 6,134,116 A | 10/2000 | Hoss et al. | 292/146 |

* cited by examiner

ELECTRONIC SYSTEM HOUSING KEYLOCK COVER

BACKGROUND OF THE INVENTION

1. Field of the Invention

This invention relates in general to electronic system housings and more specifically to keylock covers for electronic system housings.

2. Description of the Related Art

Computer systems are information handling electronic systems which can be designed to give independent computing power to one user or a plurality of users. Computer systems may be found in many forms including, for example, mainframes, minicomputers, workstations, servers, personal computers, internet terminals, notebooks, and embedded systems. Computer systems include desk top, floor standing, rack mounted, or portable versions. A typical computer system includes at least one system processor, associated memory and control logic, and a number of peripheral devices that provide input and output for the system. Such peripheral devices may include display monitors, keyboards, mouse-type input devices, floppy and hard disk drives, CD-ROM drives, printers, network capability cards, terminal devices, modems, televisions, sound devices, voice recognition devices, electronic pen devices, and mass storage devices such as tape drives, CD-R drives, or DVDs.

An electronic system housing may include a door for providing access to the interior of the electronic system housing and to other components or switches of the electronic system. For example, with some computer system servers, access to the drives of the server is controlled via a door located on a front panel. Furthermore, placing the drives behind a closed door keeps the drives hidden from view from the front. For some servers, hiding these components behind a closed door conveys an image that the server needs no human intervention. Keylocks have been used to lock the doors in a closed position to prevent physical access to the drives and other computer system components for security and safety purposes. As part of the "no human intervention" image and for other reasons, it may desirable to "hide" the keylock from normal viewing.

It has been known to position a keylock behind a door that covers hard disk drives or other peripheral devices from the front. Such a keylock has been used to lock the hard disk drives to the housing. Also, it has been known to cover control knobs on a computer system monitor via a door that is secured in a closed position with a push-push latch.

SUMMARY OF THE INVENTION

Providing an electronic system housing with a keylock cover allows a keylock of an electronic system housing to be hid from view when the keylock cover is in a closed position. Hiding the keylock with a keylock cover provides the computer system with a "no human intervention" image. Providing a push-push latch to secure the keylock cover in a closed position advantageously provides a simplified mechanism for opening and closing the keylock cover to obtain access to the keylock. In addition, a key retainer can be fixably coupled to the keylock cover to retain the key. Also, the keylock cover may include computer system identification information located on the front side of the keylock cover.

In one aspect of the invention, a computer system includes a computer system housing having a bezel and a keylock mounted in the bezel. The keylock is for locking an access door of the bezel in a closed position. The computer system also includes a keylock cover movably coupled to the bezel and movable with respect to the outer panel between an open position where the keylock is uncovered by the keylock cover and a closed position where the keylock is covered by the keylock cover.

In another aspect, the invention includes an apparatus for covering a keylock of an electronic system housing. The apparatus includes a keylock cover having an extension. The keylock cover is movably coupled to a housing. The keylock cover is movable with respect to a keylock between an open position where the keylock is uncovered by the keylock cover to a closed position where the keylock is covered by the keylock cover. The apparatus also includes a push-push latch coupled to the housing and configured to receive the extension to secure the keylock cover in a closed position.

In another aspect, the invention includes an apparatus for covering a keylock of an electronic system housing. The apparatus includes a keylock cover movable with respect to a keylock between an open position where a keylock is uncovered by the keylock cover to a closed position where the keylock is covered by the keylock cover. The apparatus also includes a key retainer configured to receive a key to retain the key to the keylock cover. The key retainer is fixably coupled to the keylock cover.

In another aspect of the invention, a computer system includes a computer system housing having an outer panel, a keylock coupled to the computer system housing, and a keylock cover having an extension. The keylock cover is movably coupled to the outer panel and movable with respect to the outer panel between an open position where the keylock is uncovered by the keylock cover and a closed position where the keylock is covered by the keylock cover. The computer system also includes a push-push latch fixably coupled to the outer panel. The push-push latch is configured to receive the extension to secure the keylock cover in a closed position.

In another aspect of the invention, a computer system includes a computer system housing including an outer panel and a keylock coupled to the computer system housing. The computer system also includes a keylock cover movably coupled to the outer panel and movable with respect to the outer panel between an open position where a keylock is uncovered by the keylock cover and a closed position where the keylock is covered by the keylock cover. The computer system further includes a key retainer configured to receive a key to retain the key to the keylock cover. The key retainer is fixably coupled to the keylock cover.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise stated.

DETAILED DESCRIPTION

The following sets forth a detailed description of a mode for carrying out the invention. The description is intended to be illustrative of the invention and should not be taken to be limiting.

Figure 1:
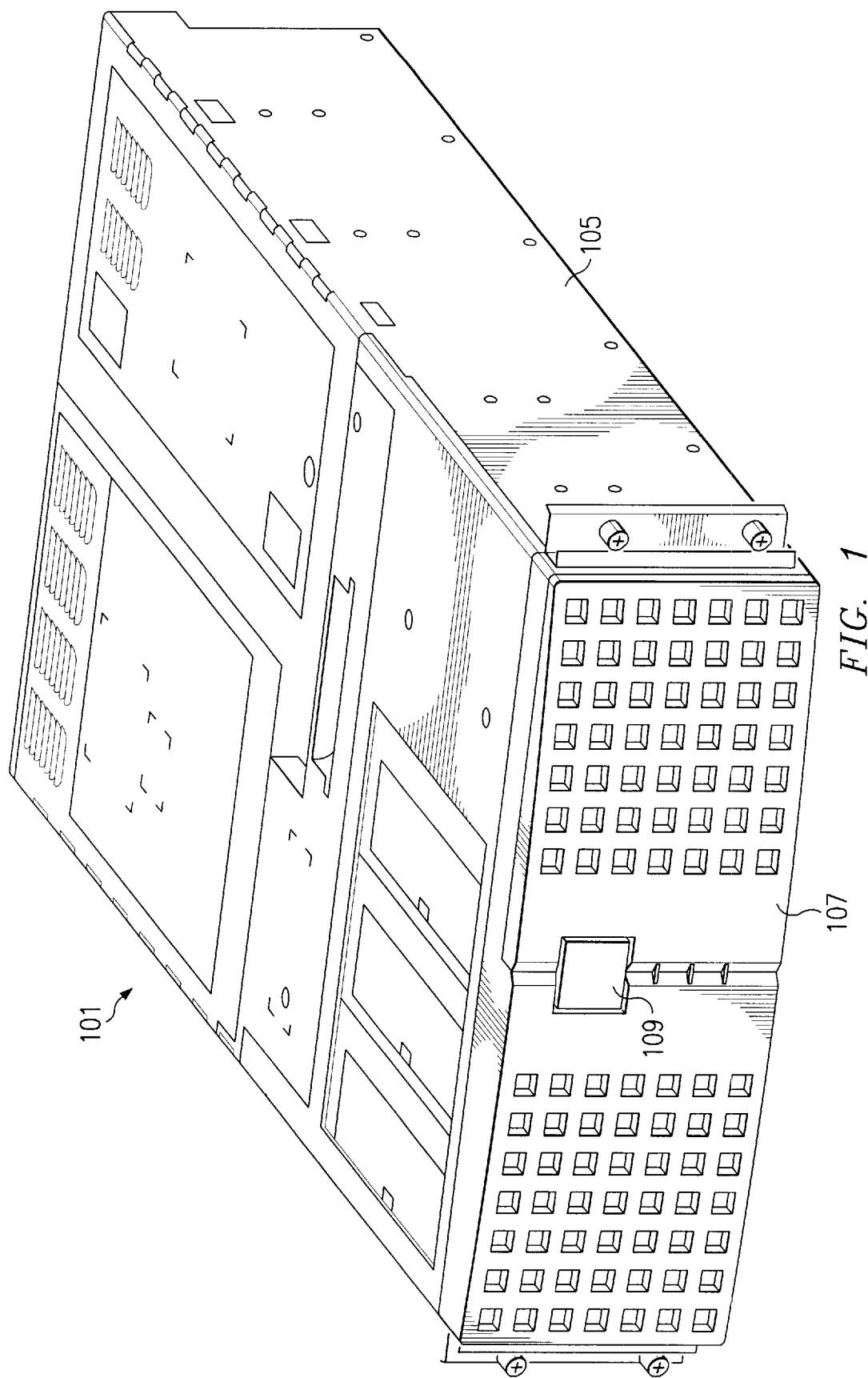
FIG. 1 shows a perspective view of an electronic system.

FIG. 1 shows a perspective view of an electronic system. The electronic system shown in FIG. 1 is a computer system server (server) 101. Server 101 is typically mounted in an electronics rack (not shown) such as a rack conforming to the Electronics Industry Association (EIA). Server 101 includes a housing 105 that houses computer components such as a system processor and memory (not shown). Housing 105 includes a bezel 107 that faces out from the front of the rack when server 101 is mounted in a rack. One example of a server is the POWER EDGE 6350 sold by the DELL COMPUTER CORP.

Figure 2:
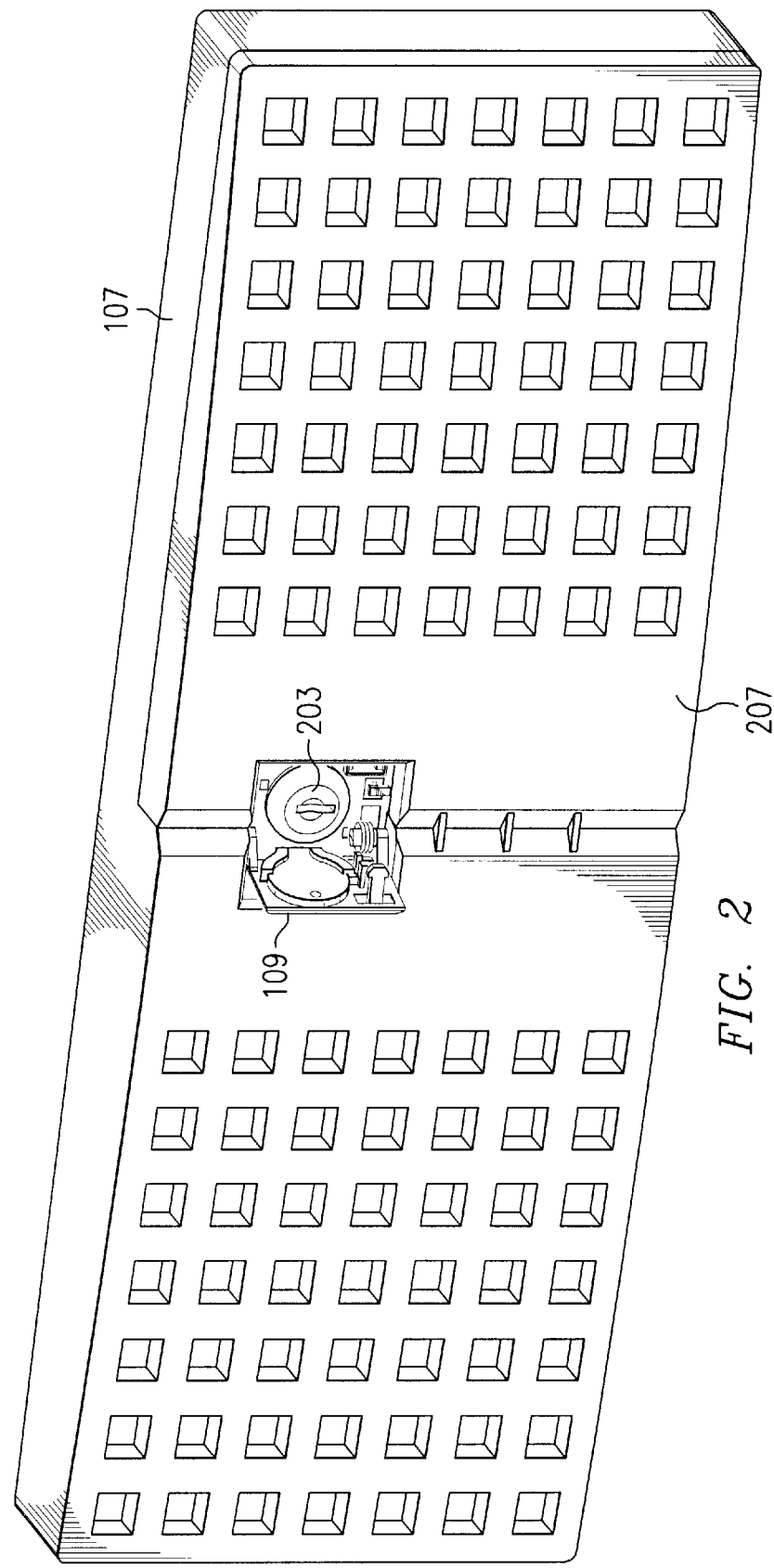
FIG. 2 shows a perspective view of an outer panel of an electronic system housing and a keylock cover in an open position according to the present invention.

Server 101 includes a keylock cover 109 that is movably coupled to bezel 107. Keylock cover 109 covers a keylock (item 203 in FIG. 2) when keylock cover 109 is in a closed position with respect to bezel 107 as shown in FIG. 1. Keylock cover 109 is movable with respect to bezel 107 from the closed position shown in FIG. 1, to an open position as shown in FIG. 2. Both keylock cover 109 and bezel 107 are of a plastic material but may be made from other materials such as metal.

Figure 7:
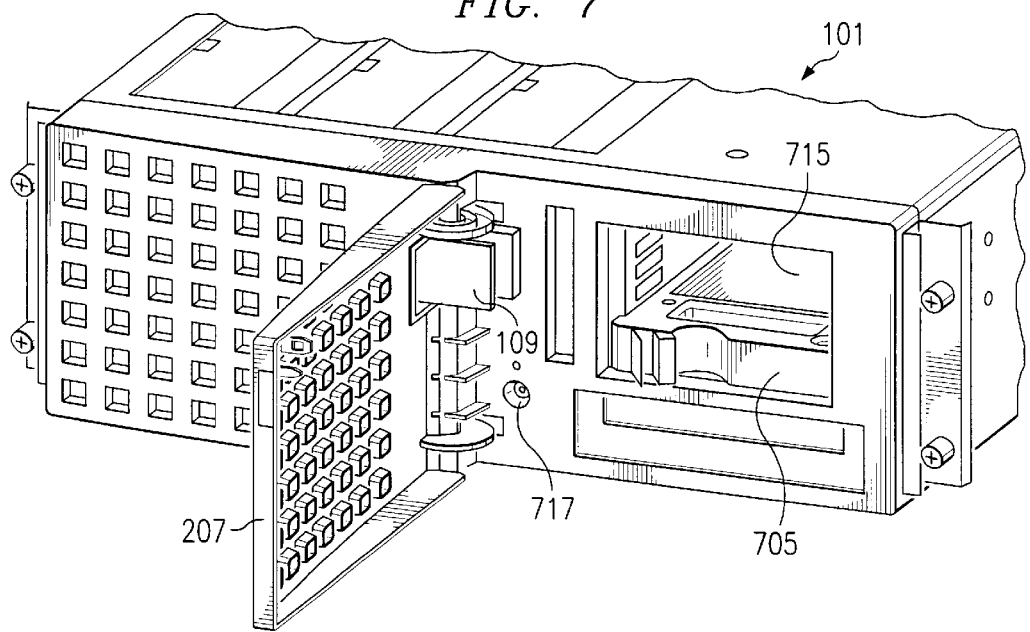
FIG. 7 is a partial perspective view of an electronic system having an outer panel with a door in an open position according to the present invention.

FIG. 2 shows a perspective view of the front side of bezel 107 with keylock cover 109 shown in an open position. With keylock cover 109 in the open position, keylock 203 is uncovered by keylock cover 109 and is both visible and accessible from the front of bezel 107. Bezel 107 includes an outer door 207 (shown in FIG. 2 in a closed position). When in an open position as shown in FIG. 7, door 207 provides access to the interior of server 101. When in a locked position, keylock 203 locks door 207 in the closed position preventing access to the interior of server 101 via door 207. With some systems, the portion of the interior accessible via door 207 may be limited to specific compartments of the interior such as e.g. a hard disk drive compartment (see item 715 of FIG. 7). Keylock 203 is mounted in bezel 107. Keylock 203 is a cylinder type keylock such as a keylock sold by ROYAL LOCK under the trade designation of FC-316-A-LC-D3. However, other types and makes of keylocks may be utilized.

Figure 3:
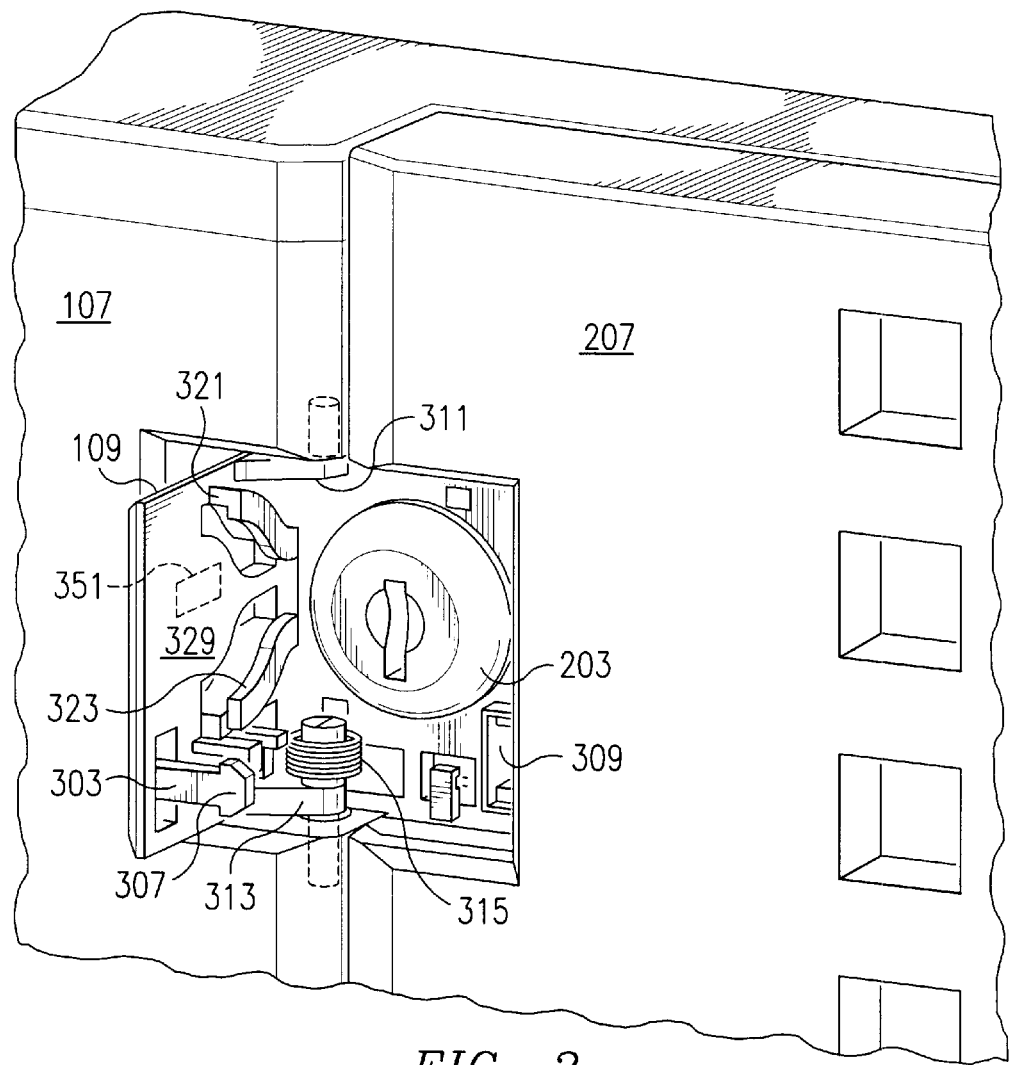
FIG. 3 is a close up view of a portion of an outer panel of an electronic system housing showing a keylock cover in an open position according to the present invention.

FIG. 3 is a close up view of a portion of bezel 107 showing keylock cover 109 in an open position. Extending from keylock cover 109 is an extension 303 having a head portion 307. Mounted in bezel 107 adjacent to keylock 203 is a push-push latch 309 (partially shown in FIG. 3) that receives and latches extension 303 when keylock cover 109 is in a closed position to secure keylock cover 109 in the closed position. One example of a push-push latch is a latch sold under the trade designation of IV60-3-9-999-9 the by ITW/FASTEX. However, other types and makes of push-push latches may be utilized with other electronic systems.

Keylock cover 109 is rotatably and hingedly coupled to bezel 107 via an upper hinge post 311 and a lower hinge post 313 that are attached to keylock cover 109. Each hinge post (311 and 313) has portions (shown in phantom in FIG. 3) that extend into openings of bezel 107. Those of skill in the art will recognize, however, that based upon the teachings herein, that other conventional techniques may be used to hingedly couple a keylock cover to a computer system housing. For example, cylindrical posts may extend out from bezel 107 wherein corresponding open collars attached to keylock cover 109 would engage the posts to couple keylock cover 109 to bezel 107. The collars would be rotatable around the posts allowing keylock cover 109 to rotate with respect to bezel 107.

Server 101 includes a spring 315 that is positioned to provide a force on keylock cover 109 to move keylock cover 109 with respect to bezel 107. In one embodiment, spring 315 is biased to provide a force against the interior side 329 of keylock cover 109 and against a surface of bezel 107 to move keylock cover 109 to an open position (as shown in FIG. 3) when push-push latch 309 is not engaging extension 303. However, in other embodiments, spring 315 is biased to move keylock cover 109 to a closed position such that keylock cover 109 would never be in an open position unless through user intervention. Spring 315 is a metal torsion type spring. However, other types of springs such as a leaf spring may be utilized in other electronic systems.

To move keylock cover 109 to a closed position (as shown in FIG. 1) from an open position shown in FIG. 3, a user would provide a force against the front side (not shown in FIG. 3) of keylock cover 109 to rotate keylock cover 109 on hinge posts 311 and 313 (against the force provided by spring 315 in one embodiment) to the closed position where extension 303 engages push-push latch 309 to secure keylock cover 109 in the closed position. To move keylock cover 109 to an open position from a closed position, the user pushes against the right front side (relative to the view shown in FIG. 1) of keylock cover 109 to push the right side of keylock cover 109 into bezel 107. Pushing the right side of keylock cover 109 into bezel 107 releases extension 303 from push-push latch 309, wherein push-push latch 309 is no longer providing a force on extension 303 to secure keylock cover 109. When a user removes the inward force on the front side of keylock cover 109 after push-push latch 309 has released extension 303, spring 315 (in one embodiment) provides a force on the interior side of keylock cover 109 to rotate keylock cover 109 to the open position. For those embodiments where spring 315 is biased to move keylock cover 109 to a closed position, upon pushing in the right side of keylock cover 109 to release extension 303 from push-push latch 309, the user would apply a force on keylock cover 109 to rotate keylock cover 109 outward to its open position shown in FIG. 3.

One advantage of providing a push-push latch to secure a keylock cover in the closed position is that the keylock cover can be released from a securing force without a user having to provide an "outward" force on the keylock cover. Thus, where a push-push latch is used, a keylock cover would not require handles or finger holds or a "finger nail indention relief" in the bezel that allows a user to place a finger nail on the inner side of the keylock cover when the keylock cover is in the closed position to provide an unlatching force against the inner side of the keylock cover. However, based upon the teachings herein, those of skill in the art will recognize that other types of latches or securing devices such as snap latches or sliding latches maybe utilized to secure a keylock cover to an electronic system housing in the closed position.

Those of skill in the art will also appreciate that, based upon the teachings herein, a keylock cover may be movably coupled to an electronic system housing by other coupling techniques or mechanisms. For example, with some electronic systems, a keylock cover is slideably coupled to the computer system housing via a sliding mechanism such that the keylock cover is slid between the open and closed positions. With other electronic systems, a keylock cover rotates in plane that is generally parallel to the front side of a bezel from an open position to a closed position.

Figure 4:
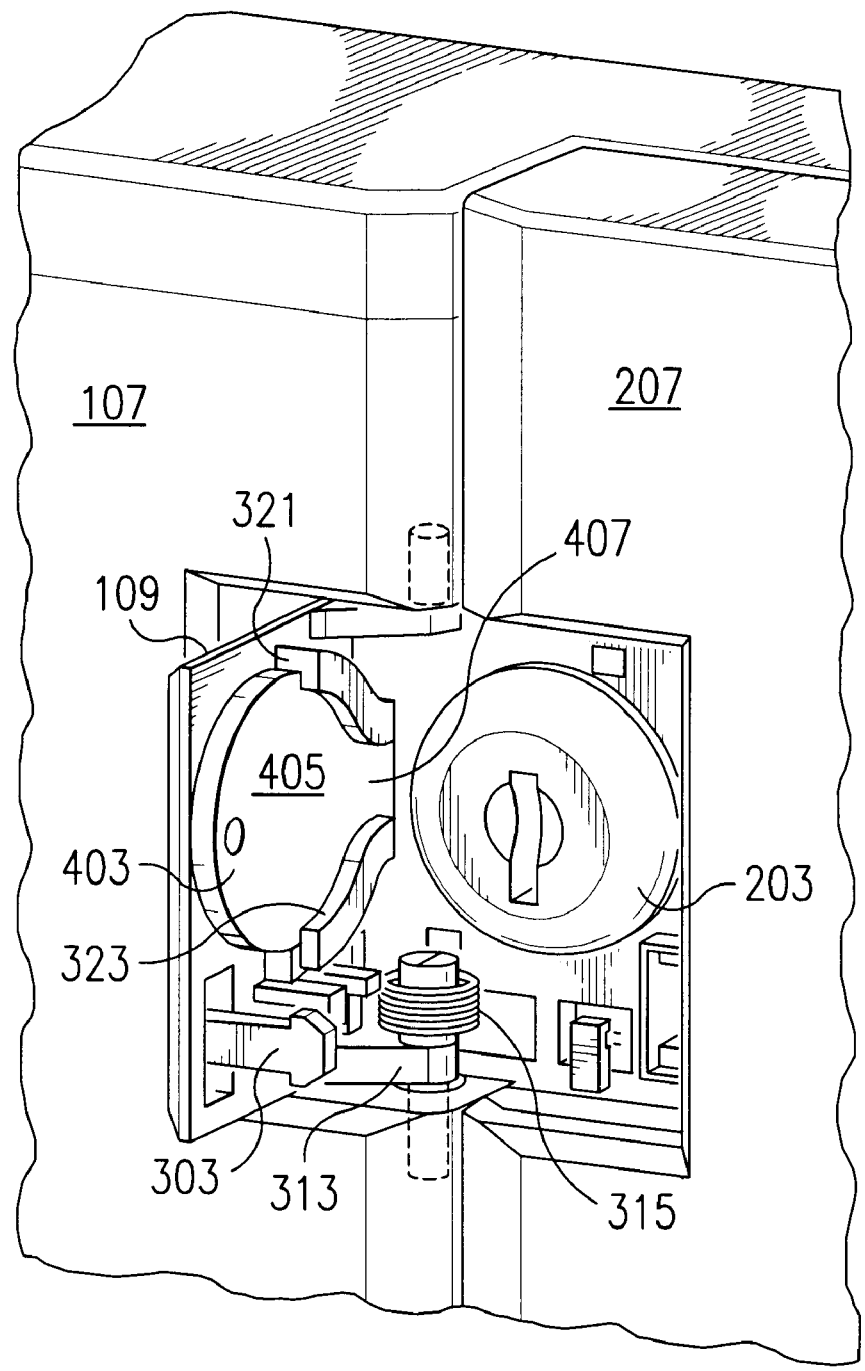
FIG. 4 is a close up view of a portion of an outer panel of an electronic system housing showing a keylock cover in an open position and a key being retained in a key retainer fixably coupled to the keylock cover according to the present invention.

FIG. 4 is a close up view of a portion of bezel 107 showing keylock cover 109 in an open position. Attached to key lock cover 109 is a key retainer that retains a key 403 that corresponds to keylock 203. The key retainer shown in FIG. 4 includes a bracket having an upper bracket member 321 and a lower bracket member 323. Upper and lower bracket members 321 and 323 each engage portions of key head 405 and key shaft 407 to retain key 407 against an inner side of the key lock cover 109. Referring back to FIG. 3, upper bracket member 321 and lower bracket member 323 are integrally connected to an inner door structure 329 of keylock cover 109. Some keylock retainers may include a wedge structure such as wedge structure 351 shown in phantom in FIG. 3 on an inner side of inner door structure 109. As a key is pushed into the key retainer, wedge structure 351 acts to force the key head (e.g. 405) of a key against the upper and lower bracket members 321 and 323 such that the key will be tightly retained by the key retainer to keylock cover 109. A key retainer may include more that one wedge structure located on inner door structure 329. With other key retainers, the portions of the upper and lower bracket members 321 and 323 that engage the key head would be tapered inward such that the key head would be tightly retained against the inner door structure 329 when the key is moved to its retained position in the key retainer as shown in FIG. 4.

Providing a keylock with a key retainer advantageously provides a convenient and accessible place for storing a key for a keylock when inhibiting physical access to the interior of the computer system is not a concern.

Figure 5:
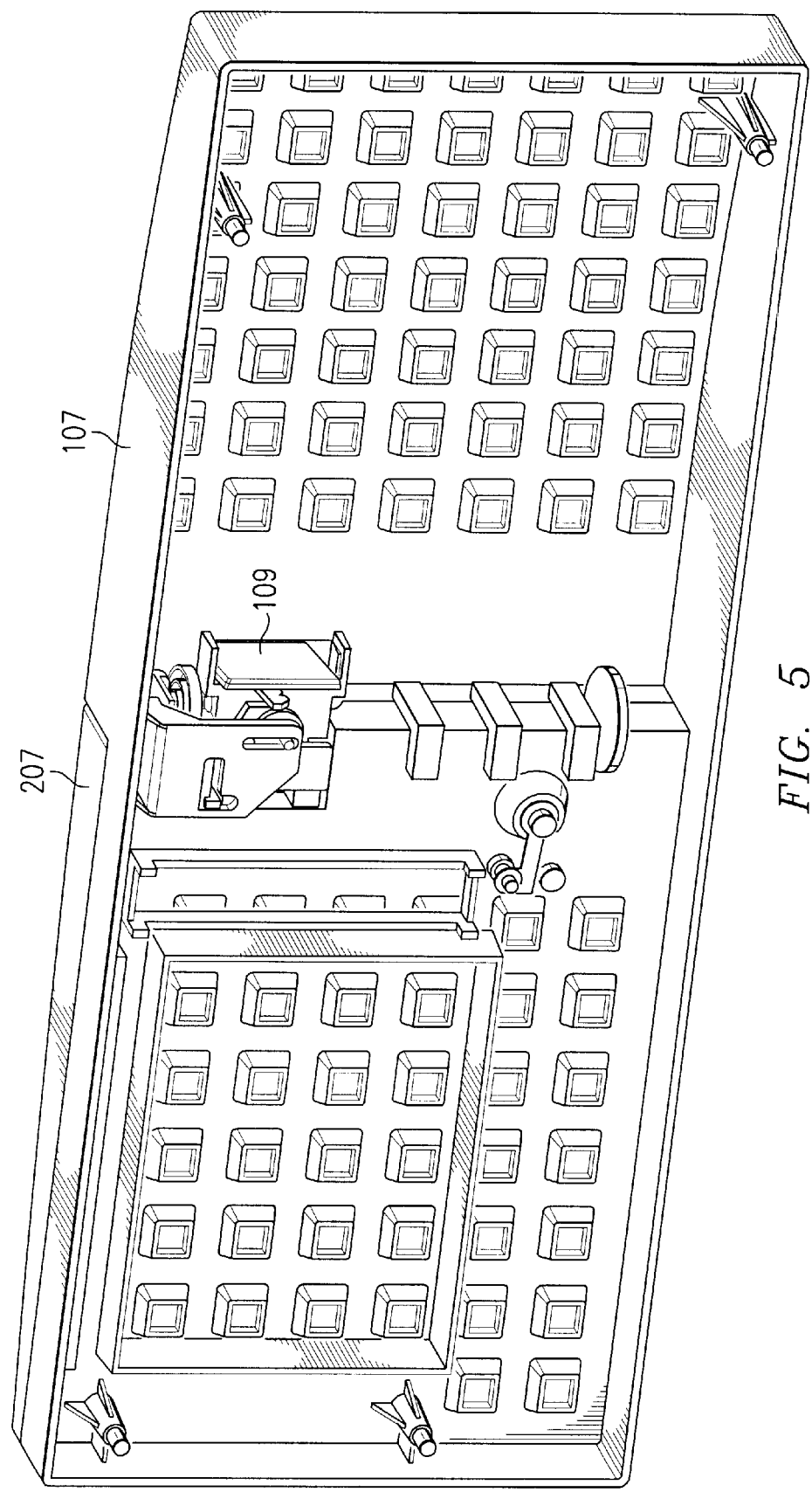
FIG. 5 is a backside perspective view of an outer panel of an electronic system housing.

FIG. 5 is a backside perspective view of bezel 107 showing keylock cover 109 in an open position.

Figure 6:
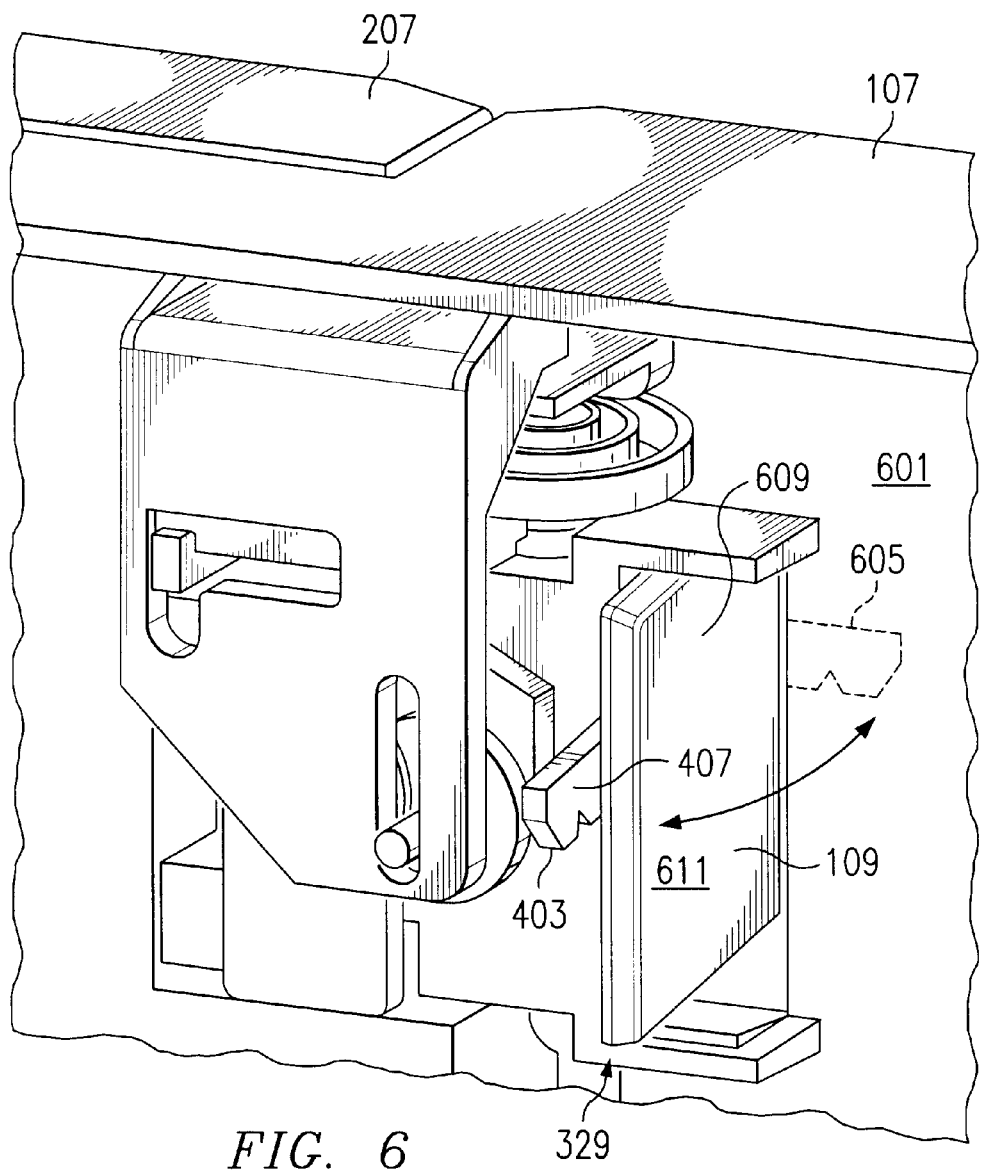
FIG. 6 is a close up, backside view of a portion of an outer panel of an electronic system housing showing a keylock cover in an open position and a key being retained in a key retainer fixably coupled to the keylock cover according to the present invention.

FIG. 6 is a close up, backside view of a portion of bezel 107 showing keylock cover 109 in an open position and key 403 being retained by the key retainer (not shown in FIG. 6). Referring to both FIG. 4 and FIG. 6, key 403 has a length that is greater than the width of keylock cover 109. Accordingly, when key 403 is retained to keylock cover 109 in a retained position, a portion of key shaft 407 extends out past keylock cover 109. Consequently, keylock cover 109 is designed such that when keylock cover 109 is moved to a closed position from an open position (as shown in FIG. 6), the portion of key shaft 407 extending out from keylock cover 109 resides next to an inner side 601 of bezel 107. Phantom lines 605 show the position of the portion of key shaft 407 extending out from keylock cover 109 when keylock cover 109 is in a closed position and the portion of key shaft 407 extending from keylock cover 109 is residing next to inner side 601.

Referring to FIGS. 1 and 6 and ahead to FIG. 7, computer system identification information 609 is located on the front side of keylock cover 109. In FIGS. 1, 6, and 7, the logo "DELL"™, a trade name for DELL COMPUTER CORP., the vendor/manufacture of server 101, is located on the front of keylock cover 109. With other systems, other types of computer system identification information may be located on the front side of keylock cover 109. For example, a trade name of the computer system such as POWER EDGE 6350 may also be located on the front side of the keylock cover. User internal numbering or other user computer system identification information may also be located on the front side of the keylock cover.

Referring back to FIG. 6, computer system identification information 609 is located on a front side of a badge 611. In FIG. 6, badge 611 is a rectangular shaped structure formed from a metal sheet and is generally coextensive with and attached to the outer side of inner door structure 329. In some systems, badge 611 is glued to the outer side of inner door structure 329, but may be attach via other conventional attaching techniques. Badge 611 has beveled edges that extend over a portion of the edge of inner door structure 329. The computer system information is placed on badge 611 by any conventional techniques such as printing, painting, and/or stamping. With other keylock covers, the computer system identification information may be located directly on the outer side of door structure 329.

Locating computer system identification information on the outer side of the keylock cover camouflages the keylock cover which contributes to the "non human intervention" image of server 101.

FIG. 7 is a partial perspective view of server 101 showing outer door 207 in an open position. Outer door 207 in an open position provides access to the interior of server housing 105. Computer system components such as hard disk drive 705 can be removed from or installed in a hard disk drive compartment 715 of server housing 105 when door 207 is in an open position. Keylock 203 being in a locked position locks outer door 207 in the closed position preventing access to the server interior via the front of server 101. Outer door 207 being locked in a closed position also inhibits access to power switch 717 thereby preventing a change in the power state of server 101 via the actuation of power switch 717. Keylock 203 being in a locked position secures bezel 107 to the remainder of housing 105.

Some computer systems may also include a disassembly button or actuator (not shown) that when actuated, releases interlocking mechanisms that retain panels of the electronic system housing (including the bezel) together thereby allowing disassembly of the electronic system housing. Closing the outer door inhibits access to the disassembly button.

Those of skill in the art will recognize that, based upon the teachings herein, several modifications may be made to the embodiments shown in FIGS. 1–7. For example, a keylock cover may have other shapes and/or forms (e.g. a disk form). Also, a keylock cover may be mounted on other panels of an electronic system housing. Furthermore, a keylock cover may be utilized with the housings of other forms of computer systems and other types of electronic systems.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A computer system comprising:
    a computer system housing including a bezel, the bezel including an access door;
    a keylock mounted in the bezel, the keylock for locking the access door in a closed position;
    a keylock cover movably coupled to the bezel and movable with respect to the bezel between an open position where the keylock is uncovered by the keylock cover and a closed position where the keylock is covered by the keylock cover;
    a key retainer configured to receive a key to retain the key to the keylock cover, the key retainer fixedly coupled to the keylock cover;
    wherein when the keylock cover is in the closed position, a key retained by the key retainer is hidden from view from the other side of the keylock cover; and
    wherein the key retainer further comprises a bracket configured to engage portions of the key to retain the key to the keylock cover.

2. The computer system of claim 1 wherein the keylock cover further includes computer system identification information located on an outer side of the keylock cover.

3. The computer system of claim 2 wherein the keylock cover further includes:
    a door structure, the door structure being movably coupled to the bezel; and
    a badge attached to an outer side of the door structure, the computer system identification information located on the outer side of the badge.

4. The computer system of claim 2 wherein the computer system identification information includes a computer system manufacturer name.

5. The computer system of claim 2 wherein the computer system identification information includes a name of the computer system.

6. The computer system of claim 3 wherein the badge is at least substantially coextensive with the outer side of the door structure.

7. The computer system of claim 1 wherein the computer system includes a computer server.

8. The computer system of claim 1 further comprising:
    a push-push latch mounted in the bezel and configured to receive an extension of the keylock cover to secure the keylock cover in the closed position.

9. An apparatus for covering a keylock of an electronic system housing, the apparatus comprising:
    a keylock cover having an extension, the keylock cover movably coupled to a housing, the keylock cover movable with respect to the keylock between an open position where the keylock is uncovered by the keylock cover to a closed position where the keylock is covered by the keylock cover;
    a push-push latch coupled to the housing and configured to receive the extension to secure the keylock cover in the closed position; and
    a key retainer configured to retain a key to the keylock cover, wherein the key has a length that is greater than a height dimension and a length dimension of the keylock cover.

10. The apparatus of claim 9 further comprising:
    at least one hinged post fixably coupled to the keylock cover, the keylock cover being rotatable on the at least one hinged post to rotate between the open position and the closed position.

11. The apparatus of claim 9 further comprising:
    a spring biased to provide a force on the keylock cover to move the keylock cover to the open position from the closed position.

12. The apparatus of claim 9 further comprising:
    a spring biased to provide a force on the keylock cover to move the keylock cover towards the closed position from the opened position.

13. A computer system comprising:
    a computer system housing including a bezel having an outer access door;
    a keylock coupled to the computer system housing for locking the outer access door in a closed position;
    a keylock cover having an extension, the keylock cover movably coupled to the bezel and movable with respect to the bezel between an open position where the keylock is uncovered by the keylock cover and a closed position where the keylock is covered by the keylock cover;
    a push-push latch fixably coupled to the bezel, the push-push latch configured to receive the extension to secure the keylock cover in the closed position;
    a key retainer configured to receive a key to retain the key to the keylock cover, the key retainer fixedly coupled to the keylock cover;
    wherein when the keylock cover is in a closed position, a key retained by the key retainer is hidden from view from the other side of the keylock cover; and
    wherein the key retainer further comprises a bracket configured to engage portions of the key to retain the key to the keylock cover.

14. The computer system of claim 13 wherein the keylock cover is hingedly coupled to the bezel.

15. The computer system of claim 13 wherein the outer access door is hingedly attached to a remaining portion of the bezel, the outer access door being lockable in the closed position via the keylock being in a locked position.

16. The computer system of claim 15 further comprising:
    at least one computer system component housed within the computer system housing, the at least one computer system component being accessible via the outer access door in an open position.

17. The computer system of claim 16 wherein the at least one computer system component includes a hard disk drive.

18. The computer system of claim 13 wherein the keylock cover further includes computer system identification information located on an outer side of the keylock cover.

19. The computer system of claim 13 further comprising:
    a spring biased to provide a force on the keylock cover to move the keylock cover to the open position from the closed position.

20. The computer system of claim 13 further comprising:
    a spring biased to provide a force on the keylock cover to move the keylock cover towards the closed position from the open position.

21. The computer system of claim 13 wherein the keylock and push-push latch are mounted in the housing.

22. A computer system comprising:
    a computer system housing including an outer panel having an access door;
    a keylock coupled to the computer system housing for locking the access door in a closed position; a keylock cover movably coupled to the outer panel and movable with respect to the outer panel between an open position where the keylock is uncovered by the keylock cover and a closed position where the keylock is covered by the keylock cover;

a key retainer configured to receive a key to retain the key to the keylock cover, the key retainer fixedly coupled to the keylock cover;

wherein when the keylock cover is in the closed position, a key retained by the key retainer is hidden from view from the other side of the keylock cover; and wherein the key retainer further comprises a bracket configured to engage portions of the key to retain the key to the keylock cover.

23. The computer system of claim 22 wherein the keylock cover is hingedly coupled to the outer panel.

24. The computer system of claim 22 wherein the access door is hingedly attached to a remaining portion of the outer panel, the access door being lockable in a closed position via the keylock being in a locked position; and at least one computer system component housed within the computer system housing, the at least one computer system component being accessible via the access door in an open position.

25. The computer system of claim 22 wherein the key retainer is located on an inner side of the keylock cover.

26. The computer system of claim 22 wherein the key retainer is configured to retain a key on an inner side of the keylock cover, wherein when the keylock cover is in the closed position, a key retained by the key retainer is hidden from view from the other side of the keylock cover.

27. The computer system of claim 22 wherein the access door is hingedly attached to a remaining portion of the outer panel, the access door being lockable in the closed position via the keylock being in a locked position; and wherein the computer system further comprises a power switch for changing a power state of the computer system, the power switch being accessible via the access door in an open position.

28. A computer system comprising:

a computer system housing including an outer panel having an access door;

a keylock coupled to the computer system housing for locking the access door in a closed position; a keylock cover movably coupled to the outer panel and movable with respect to the outer panel between an open position where the keylock is uncovered by the keylock cover and a closed position where the keylock is covered by the keylock cover;

a key retainer configured to receive a key to retain the key to the keylock cover, the key retainer fixedly coupled to the keylock cover;

wherein when the keylock cover is in a closed position, a key retained by the key retainer is hidden from view from the other side of the keylock cover; and wherein the key retainer further comprises a bracket configured to engage portions of the key to retain the key to the keylock cover.

29. The computer system of claim 28 wherein the bracket includes an upper bracket member and a lower bracket member.

30. The computer system of claim 28 wherein the bracket is configured to engage at least a portion of a key head of a key in retaining the key to the keylock cover.

31. The computer system of claim 30 wherein the key retainer further includes:

at least one wedge structure located on an inner side of the keylock cover, wherein when a key is retained by the key retainer, the wedge structure engages the portion of the key head to wedge the key head against the bracket to tightly retain the key.

32. The computer system of claim 28 wherein the bracket is configured to engage at least a portion of a key shaft of the key in retaining the key to the keylock cover.

33. The computer system of claim 28 wherein the bracket is integrally connected to at least a portion of the keylock cover.

34. A computer system comprising:

a computer system housing including an outer panel having an access door;

a keylock coupled to the computer system housing for locking the access door in a closed position;

a keylock cover movably coupled to the outer panel and movable with respect to the outer panel between an open position where the keylock is uncovered by the keylock cover and a closed position where the keylock is covered by the keylock cover;

a key retainer configured to receive a key to retain the key to the keylock cover, the key retainer fixedly coupled to the keylock cover;

wherein the key retainer is configured to retain a key on an inner side of the keylock cover, wherein when the keylock cover is in a closed position, a key retained by the key retainer is hidden from view from the other side of the keylock cover; and wherein the keylock cover has a height dimension and a length dimension, the key having a length greater than the height dimension and the length dimension.

35. A computer system comprising:

a computer system housing including a bezel, the bezel including an access door; a keylock mounted in the bezel, the keylock for locking the access door in a closed position;

a keylock cover movably coupled to the bezel and movable with respect to the bezel between an open position where the keylock is uncovered by the keylock cover and a closed position where the keylock is covered by the keylock cover;

a key retainer configured to receive a key, the key retainer fixedly coupled to the keylock cover; and wherein the key retainer is configured to retain a key on an inner side of the keylock cover, wherein when the keylock cover is in a closed position, a key retained by the key retainer is hidden from view from the other side of the keylock cover, wherein the keylock cover has a height dimension and a length dimension, the key having a length greater than the height dimension and the length dimension.

36. A computer system housing comprising:

a bezel, including an access door;

a keylock mounted in the bezel and selectably operable to lock and unlock the access door; and a means mounted on the bezel for causing the keylock to be alternatively accessible or inaccessible;

a key retainer configured to receive a key to retain the key to a keylock cover, the key retainer fixedly coupled to the keylock cover;

wherein when the keylock cover is in a closed position, a key retained by the key retainer is hidden from view from the other side of the keylock cover; and wherein the key retainer further comprises a bracket configured to engage portions of the key to retain the key to the keylock cover.

37. A computer housing as defined in claim 36, wherein the means comprises:

the keylock cover movable with respect to the keylock between an open position where the keylock is uncovered by the keylock cover and the closed position where the keylock is covered by the keylock cover; and a push-push latch mounted on the computer system housing and configured to secure the keylock cover in the closed position.

38. A computer system housing as defined in claim 36, wherein the key retainer further comprises:

a bracket configured to engage portions of the key to retain the key to the keylock cover.

39. A computer system housing as defined in claim 38, wherein the bracket is configured to engage at least a portion of a key head of a key in retaining the key to the keylock cover.

40. A computer system housing as defined in claim 38, wherein the bracket is configured to engage at least a portion of a key shaft of the key in retaining the key the keylock cover.

41. A computer system housing as defined in claim 38, wherein the bracket is integrally connected to at least a portion of the keylock cover.

42. A computer system housing as defined in claim 38, wherein the bracket includes an upper bracket member and a lower bracket member.

43. A computer system housing as defined in claim 38, wherein the key retainer further includes:

at least one wedge structure located on an inner side of the keylock cover, wherein when a key is retained by the key retainer, the wedge structure engages a portion of the key head to wedge the key head against the bracket to tightly retain the key.

44. A computer system housing as defined in claim 36, wherein the means comprises a keylock cover movable with respect to the keylock between a first position in which the keylock is accessible and a second position in which the keylock is inaccessible.

45. A computer system housing as defined in claim 36, wherein the means comprises a push-push latch mounted on the computer system housing and configured to secure the keylock cover in a first position.

* * * * *